United States Patent
Lingafelt et al.

(10) Patent No.: US 9,734,450 B2
(45) Date of Patent: Aug. 15, 2017

(54) DATA LOSS PREVENTION TO REMOVE FALSE POSITIVES

(71) Applicant: Lenovo Enterprise Solutions (Singapore) PTE. LTD., Singapore (SG)

(72) Inventors: Charles Steven Lingafelt, Durham, NC (US); James William Murray, Durham, NC (US); James Thomas Swantek, Canton, GA (US); James Steven Worely, Raleigh, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 569 days.

(21) Appl. No.: 14/297,035

(22) Filed: Jun. 5, 2014

(65) Prior Publication Data
US 2015/0356445 A1    Dec. 10, 2015

(51) Int. Cl.
*H04L 12/24*    (2006.01)
*G06N 5/02*    (2006.01)

(52) U.S. Cl.
CPC ......... *G06N 5/025* (2013.01); *H04L 41/0604* (2013.01)

(58) Field of Classification Search
CPC .......... G06N 3/04; G06N 3/049; G06N 5/025; H04L 41/0604
See application file for complete search history.

(56) References Cited

U.S. PATENT DOCUMENTS

| | | | |
|---|---|---|---|
| 5,452,442 A | 9/1995 | Kephart | |
| 5,497,423 A | 3/1996 | Miyaji | |
| 6,782,377 B2 * | 8/2004 | Agarwal | G06F 17/30707 706/21 |
| 7,096,498 B2 | 8/2006 | Judge | |
| 7,450,005 B2 | 11/2008 | Anand | |
| 7,540,025 B2 | 5/2009 | Tzadikario | |
| 7,792,775 B2 | 9/2010 | Matsuda | |
| 7,874,000 B1 * | 1/2011 | Lal | G06F 21/55 726/23 |
| 7,885,915 B2 * | 2/2011 | Parson | G06F 17/271 706/47 |
| 8,010,614 B1 * | 8/2011 | Musat | G06Q 10/107 709/206 |
| 8,091,114 B2 | 1/2012 | Lommock et al. | |

(Continued)

OTHER PUBLICATIONS

Intrusion Detection systems—Analysis and Containment of False Positive Alerts, by Victor, 2010.*

(Continued)

*Primary Examiner* — Stanley K Hill
*Assistant Examiner* — Thomas Fink
(74) *Attorney, Agent, or Firm* — Olive Law Group, PLLC

(57) ABSTRACT

A method includes a computing device receiving data traffic flow and initializing a subroutine to assess alerts for the received data traffic flow; the computer device determining a collection of rules which produce more than a threshold of false positive alerts and more than a threshold of true positive alerts for the assessed alerts; the computer device determining a logical condition and an atomic rule element to add to the collection of rules; and the computer device implementing the added logical condition and atomic rule element if the number of assessed alerts are decreased below a value.

20 Claims, 4 Drawing Sheets

(56) References Cited

U.S. PATENT DOCUMENTS

| | | | |
|---|---|---|---|
| 8,098,677 B1* | 1/2012 | Pleshek | H04L 43/12 370/351 |
| 8,161,548 B1* | 4/2012 | Wan | G06F 21/566 713/188 |
| 8,195,689 B2 | 6/2012 | Ramanathan | |
| 8,239,948 B1* | 8/2012 | Griffin | H04L 63/1416 726/22 |
| 8,356,354 B2* | 1/2013 | Nazarov | G06F 21/56 713/187 |
| 8,839,417 B1* | 9/2014 | Jordan | H04L 63/1416 709/223 |
| 9,223,972 B1* | 12/2015 | Vincent | G06F 21/566 |
| 9,405,900 B2* | 8/2016 | Dixit | G06F 21/55 |
| 2004/0181664 A1 | 9/2004 | Hoefelmeyer | |
| 2004/0230546 A1 | 11/2004 | Rogers | |
| 2006/0107321 A1* | 5/2006 | Tzadikario | H04L 63/0227 726/22 |
| 2009/0013414 A1* | 1/2009 | Washington | G06F 21/10 726/32 |
| 2009/0158430 A1 | 6/2009 | Borders | |
| 2010/0083375 A1 | 4/2010 | Friedman | |
| 2010/0100468 A1 | 4/2010 | Spector et al. | |
| 2010/0161830 A1 | 6/2010 | Noy et al. | |
| 2010/0162347 A1 | 6/2010 | Barile | |
| 2010/0254615 A1 | 10/2010 | Kantor et al. | |
| 2010/0274691 A1 | 10/2010 | Hammad et al. | |
| 2011/0126286 A1* | 5/2011 | Nazarov | G06F 21/564 726/24 |
| 2011/0155801 A1 | 6/2011 | Rowberry | |
| 2011/0225650 A1 | 9/2011 | Margolies et al. | |
| 2011/0238855 A1* | 9/2011 | Korsunsky | G06F 21/55 709/231 |
| 2011/0264612 A1* | 10/2011 | Ryman-Tubb | G06Q 20/4016 706/12 |
| 2011/0295854 A1* | 12/2011 | Chiticariu | G06F 17/30616 707/737 |
| 2012/0116892 A1 | 5/2012 | Opdycke | |
| 2012/0167219 A1* | 6/2012 | Zaitsev | G06F 21/566 726/24 |
| 2012/0260342 A1* | 10/2012 | Dube | G06F 21/564 726/24 |
| 2014/0173727 A1* | 6/2014 | Lingafelt | G06F 21/552 726/22 |
| 2015/0096021 A1* | 4/2015 | Uscilowski | G06F 21/564 726/23 |

OTHER PUBLICATIONS

False Positive Reduction Techniques in Intrusion Detection Systems—A Review, by Mokarian, 2013.*

Automatically Generated WIN32 Heuristic Virus Detection, by Arnold, 2000.*

* cited by examiner

DATA LOSS PREVENTION TO REMOVE FALSE POSITIVES

BACKGROUND

The present invention relates to unique inaudible sound signatures, and more specifically, to using unique inaudible sound signatures determine specific vehicle information.

SUMMARY

According to one aspect of the present invention, a method includes a computing device receiving data traffic flow and initializing a subroutine to assess alerts for the received data traffic flow; the computer device determining a collection of rules which produce more than a threshold of false positive alerts and more than a threshold of true positive alerts for the assessed alerts; the computer device determining a logical condition and an atomic rule element to add to the collection of rules; and the computer device implementing the added logical condition and atomic rule element if the number of assessed alerts are decreased below a value.

According to another aspect of the present invention, a system includes one or more processors, one or more computer-readable memories and one or more computer-readable, tangible storage devices; a receiving module operatively coupled to at least one of the one or more storage devices for execution by at least one of the one or more processors via at least one of the one or more memories, configured to receive data traffic flow and initializing a subroutine to assess alerts for the received data traffic flow; a determining module operatively coupled to at least one of the one or more storage devices for execution by at least one of the one or more processors via at least one of the one or more memories, configured to determine a collection of rules which produce more than a threshold of false positive alerts and more than a threshold of true positive alerts for the assessed alerts; the determining module operatively coupled to at least one of the one or more storage devices for execution by at least one of the one or more processors via at least one of the one or more memories, configured to determine a logical condition and an atomic rule element to add to the collection of rules; and an implementing module operatively coupled to at least one of the one or more storage devices for execution by at least one of the one or more processors via at least one of the one or more memories, configured to implement the added logical condition and atomic rule element if the number of assessed alerts are decreased below a value.

According to yet another aspect of the present invention, a computer product including: one or more computer-readable, tangible storage medium; program instructions, stored on at least one of the one or more storage medium, to receive data traffic flow and initialize a subroutine to assess alerts for the received data traffic flow; program instructions, stored on at least one of the one or more storage medium, to determine a collection of rules which produce more than a threshold of false positive alerts and more than a threshold of true positive alerts for the assessed alerts; program instructions, stored on at least one of the one or more storage medium, to determine a logical condition and an atomic rule element to add to the collection of rules; and program instructions, stored on at least one of the one or more storage medium, to implement the added logical condition and atomic rule element if the number of assessed alerts are decreased below a value.

DETAILED DESCRIPTION

Figure 1:
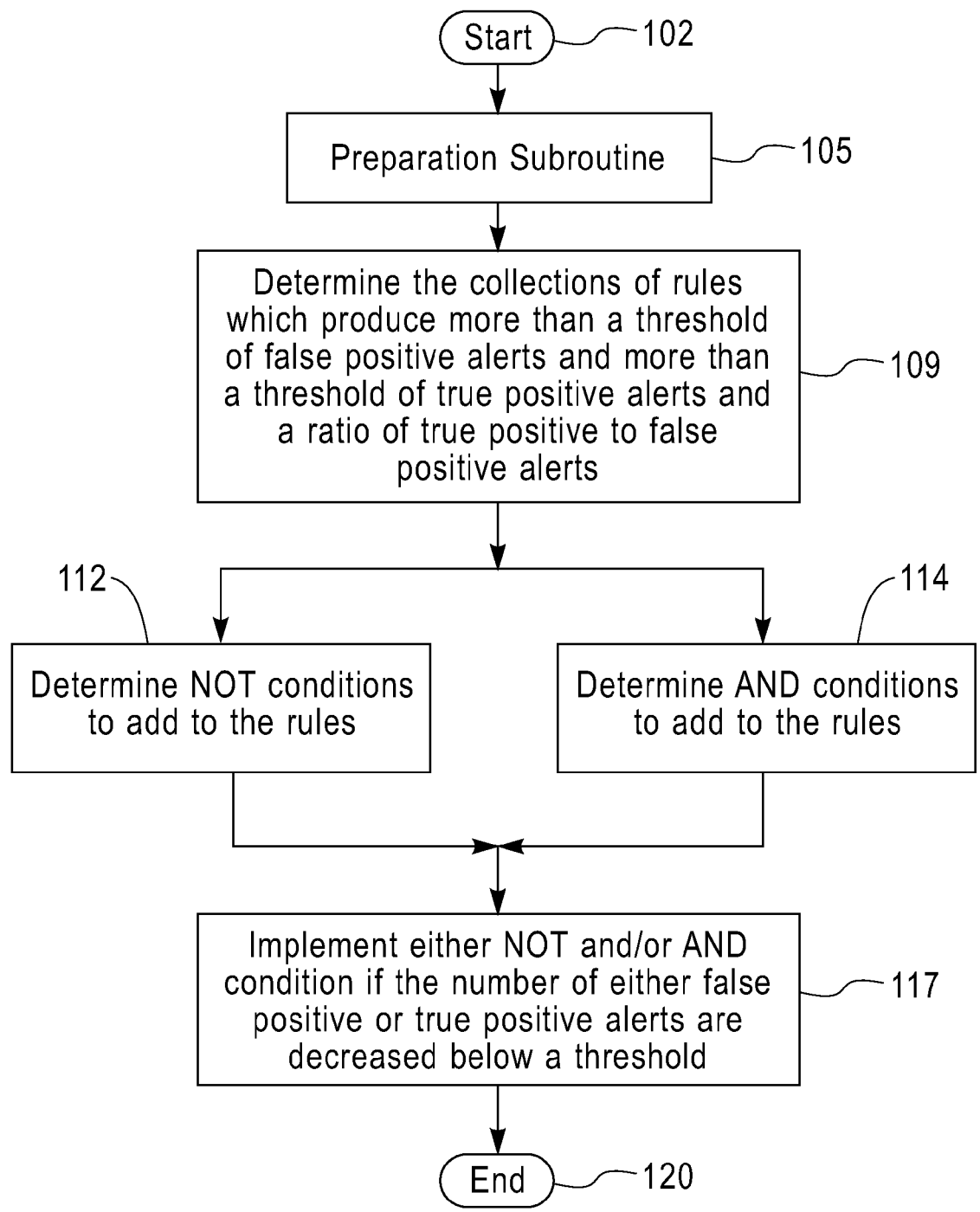
FIG. 1 shows a flowchart according to an embodiment of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. As will be appreciated by one skilled in the art, aspects of the present invention may be embodied as a system, method or computer program product.

Data Loss Prevention (DLP) systems examine packet and message flows within a network link. These links are typically at key points in the network, e.g., at the egress between the intranet and the internet. DLP rules describe what the systems will look for in the flows. Today, these DLP systems generate an enormous number of false positive alerts, and the tuning or alteration of the rules are dependent on the particular skills of the tuner.

Because the rules are extremely flexible and numerous, multiple different rules could each detect a true alert for the given set of data examined, and these same different rules could produce different amounts of false positive alerts. Thus, one job of the tuner is to identify those rules from a set that will most often correctly yield a true alert, but minimize the false positives, then remove the other rules that produce greater false positive alerts. Those rules whose performance produces more false positive alerts have no or limited value to the system.

DEFINITIONS rule—the signature use to describe the packet characteristics, which, if found in a packet, would be viewed as an alert, with the packet and associated meta data copied into an alert database for subsequent analysis.

alert—the indication that a packet matched a rule. Alerts may be valid or false positives.

atomic rule attribute—a discrete rule element. Rules are constructed from one or more atomic rule elements, associated with logical expressions. For example "this_characterstring" or "this_other_charater_sting" or "this_other_charater_string_with_wild_card_characters" or "this data element" are each an atomic rule element. The specifics of an atomic rule element are implementation and technology dependent.

occurrence_threshold_true, occurrence_threshold_false—indicates degree of how often a given atomic rule element is present within a collection of true positive rules or false positive rules respectively.

false_positive_rule_element_list—list of atom rule elements that are generally common to rules which produce false positive alerts.

true_positive_rule_element_list—list of atom rule elements that are generally common to rules which produce true positive alerts.

false_positive_decrease_threshold_change_amount—the threshold degree to which false positive alerts are decreased that the rule is altered. For example if the threshold was 50% and the change reduced the false positive alerts by 80%, then the rule is altered.

true_positive_decrease_threshold_change_amount—the threshold degree to which true positive alerts are decreased that the rule is altered. For example if the threshold was 15% and the change reduced the true positive alerts by 25%, then the rule is not altered.

false_ratio_threshold—threshold below which a rule is to be placed into the false positive rule collection.

true_positive_ratio_threshold—threshold, above which a rule is to be placed into the true positive rule collection.

Now referring to FIG. 1, an embodiment of the present invention includes a process of conducting analytics on the dataflow from data loss prevention (DLP) systems. The process starts (102) by the preparation of a subroutine (105) to store historical alerts in a database, assess each alert and designate an alert_validity_attribute indicating if alert is false positive or valid alert. The preparation of the subroutine (105) further assess each alert and designates the rule which produced the alert, determines the occurrence_threshold_false and determines the occurrence_threshold_true. Yet another aspect that the preparation of the subroutine (105) determines is the false_positive_decrease_threshold_change_amount and the true_positive_decrease_threshold_change_amount. The process continues with determining collections of rules which produce more than a threshold of false positive alerts and more than a threshold of true positive alerts (109). An additional aspect of this stage in the process is to determine a ratio of true positive to false positive alerts (109). Specifically, for rules with a ratio less than a false_ratio_threshold, the rule is placed in a collection of rules which produce false positives. For rules with ratio greater than a true_positive_ratio_threshold, the rule is placed in a collection of rules with produce true positives. As a result of determining the collection of rules (109) the process determines logical NOT conditions to add to the rules (112) and logical AND conditions to add to the rules (114). The process implements either the NOT and/or AND conditions if the number of either false positive or true positive alerts are decreased below a threshold (117) and ends (120). The process to implement either the NOT and/or AND conditions will be further explained with reference to FIGS. 2A and 2B.

Figure 2:
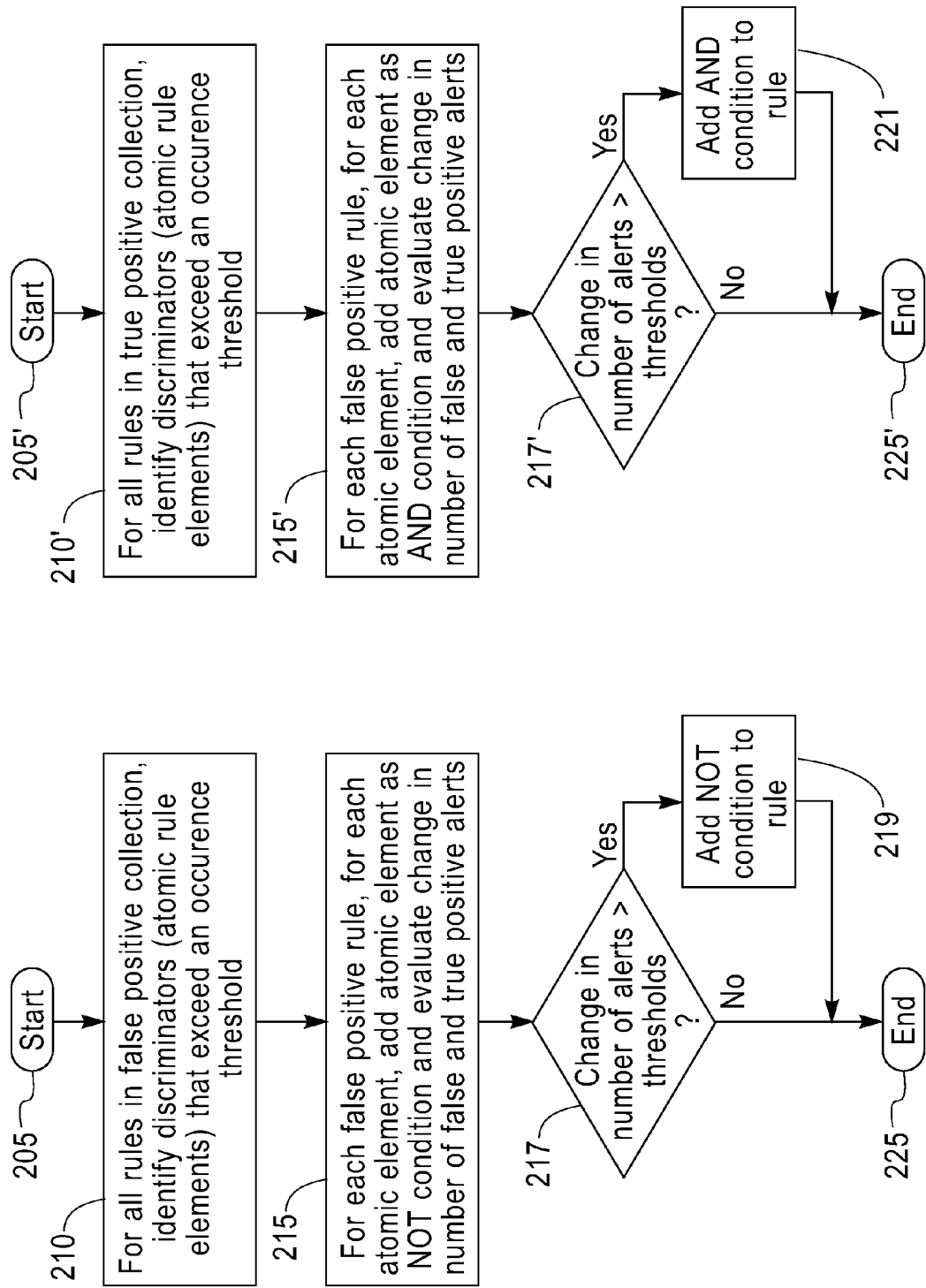
FIGS. 2A and 2B show flowcharts according to another embodiment of the present invention.

Now referring to FIG. 2A, an embodiment of the present invention includes a process of determining whether to add the logical NOT condition to the rules. The process starts 205 by looking at all rules in false positive collection and identifies discriminators (atomic rule elements) that exceed an occurrence threshold (210). For each false positive rule add an atomic element as a NOT condition and evaluate change in number of false and true positive alerts (215). The process looks for a change in the number of alerts greater than a threshold (217). If the change is greater than the threshold then the logical NOT condition is added to the rule (219). If the change is equal or less than the threshold then the rule is not modified and the process ends (225).

FIG. 2A, by way of one possible embodiment, may be represented by the following pseudo code:

```
Determine collection of rules which produce false positive alerts
Determine collection of rules which produce true positive alerts
For each rule in collection of rules which produce false positive alerts
    For each atomic rule attribute
        Determine the frequency of the atomic rule attribute's use
        among collection of false positive rules
    end for
end for
For each atomic rule attribute
    If frequency > occurrence_ threshold_false then place atomic rule
    attribute into false_positive_rule_element_list
end for
/* false_positive_rule_element_list now contains list of atomic rule
attributes (common elements which frequently have been found to
occur in rules that are frequently found to result in false positive alerts)
that can be assessed for their effect against all rules */
For each "element" in the false_positive_rule_element_list
    For each rule in collection of false positive rules
        Add condition to rule: NOT "element" from the
        false_positive_rule_element_list
        Assess the degree to which the rule with the new NOT
        conditional would have decreased the number of false
        positives alerts
        Assess the degree to which the rule with the new NOT
        conditional would have decreased the number of true
        positives alerts
        If ( change in number of false positive alerts >
        false_positive_decrease_threshold_change_amount ) and
        ( change in number of true positive alerts <
        true_positive_decrease_threshold_change_amount ) then
        change the rule
        /* (by the addition of the new NOT conditional) */
    end for
end for.
```

Now referring to FIG. 2B, an embodiment of the present invention includes a process of determining whether to add the logical AND condition to the rules. The process starts 205' by looking at all rules in true positive collection and identifies discriminators (atomic rule elements) that exceed an occurrence threshold (210'). For each false positive rule add an atomic element as an AND condition and evaluate change in number of false and true positive alerts (215'). The process looks for a change in the number of alerts greater than a threshold (217'). If the change is greater than the threshold then the logical AND condition is added to the rule (221). If the change is equal or less than the threshold then the rule is not modified and the process ends (225').

FIG. 2B, by way of one possible embodiment, may be represented by the following pseudo code:

```
Determine collection of rules which produce false positive alerts
Determine collection of rules which produce true positive alerts
For each rule in collection of rules which produce true positive alerts
    For each atomic rule attribute
        Determine the frequency of the atomic rule attribute's use
        among collection of true positive rules
    end for
end for
For each atomic rule attribute
    If frequency > occurrence_ threshold_true then place atomic rule
    attribute in to true_positive_rule_element_list
end for
/* true_positive_rule_element_list now contains list of atomic rule
attributes (common elements which frequently have been found to
occur in rules that are frequently found to result in true positive alerts)
that can be assessed for their effect against all rules */
For each "element" in the true_positive_rule_element_list
    For each rule in collection of false positive rules
        Add condition to rule: AND "element" from the
        false_positive_rule_element_list
```

-continued

```
            Assess the degree to which the rule with the new AND
            conditional would have decreased the number of false
            positives alerts
            Assess the degree to which the rule with the new AND
            conditional would have decreased the number of true
            positives alerts
            If ( change in number of false positive alerts >
            false_positive_decrease_threshold_change_amount ) and
            ( change in number of true positive alerts <
            true_positive_decrease_threshold_change_amount ) then
            change the rule
            /* (by the addition of the new AND conditional) */
      end for
end for.
```

Figure 3:
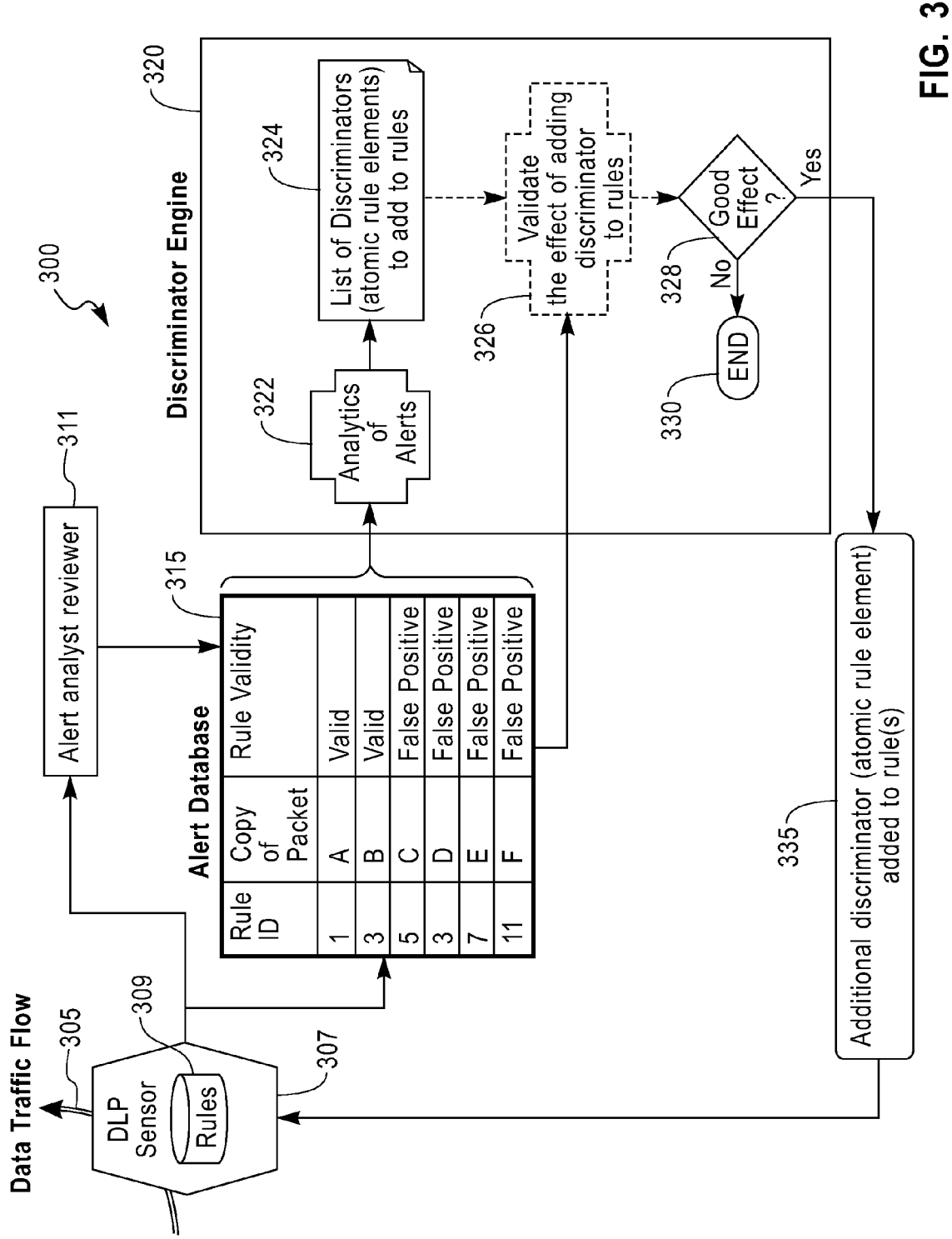
FIG. 3 shows exemplary implementation according to an embodiment of the present invention.

Referring to FIG. 3, an exemplary implementation according to an embodiment of the present invention is depicted. A DLP sensor 307 examines the data traffic flow 305 and using a rules database 309 generates a set of alerts. Each alert contains the ID of the rule which caused the alert and are stored in an alert database 315. An alert analyst reviewer 311 determines and marks if an alert is a false positive or a true positive. The false positive or a true positive determinations are added to the alert database 315. The rule alert database 315 is configured to group the rules validity into two groups: rules that produced true alerts and rules that produced false alerts based on user specified thresholds of number/proportion of false and true positives. Information within the alert database 315 is supplied to a discriminator engine 320. Handling of the information will described in combination with the use of the discriminator engine 320 and the below tables. An analytics engine 322 conducts analytics of the alerts contained within the alert database 315. Specifically, the analytics engine 322 identifies a list of the most frequent collection of discriminators (atomic rule elements). These discriminators (atomic rule elements) are then temporally added (324) to the existing rule set as a <NOT> discriminator, or an <AND> discriminator. The discriminator engine 320 validates the effects of adding the discriminator to the rules (326) by reapplying it to the historical data of alerts received from the alert database 315 to quantify the effect of the addition of the discriminator. If the effect of the additional discriminator (atomic rule elements) exceed a threshold (328), then the operational rule database is changed (335).

By way of illustration, the following explains an embodiment of the present invention. In this illustration, the rules are place into one of three groups based on thresholds:
  rules with produce true positives collection
  rules which produce false positives collection
  neither collection
  false_ratio_threshold=15%
  true_positive_ratio_threshold=75%

TABLE 1

| Rule ID | ratio of true positives to false positive | which collection to place rule into |
|---|---|---|
| 1 | 2% (for every 2 true positive alerts, 98 false positive alerts were created. 2% is less than the threshold of 15%) | rules which produce false positives collection |
| 2 | 3% | rules which produce false positives collection |
| 3 | 4% | rules which produce false positives collection |
| 5 | 10% | rules which produce false positives collection |
| 7 | 20% | neither collection |
| 11 | 40% | neither collection |
| 13 | 40% | neither collection |
| 17 | 60% | neither collection |
| 19 | 80% (for every 80 true positive alerts, 20 false positive alerts were created. 80% is more than the threshold of 75%) | rules with produce true positives collection |

An illustration would include: Identify atomic rule attributes that are more common to false positive alerts, but not common to true alerts, then add this element as a NOT conditional.

Rules which produced the most false positive alerts:

TABLE 2

| rule | ID Atomic Rule Attributes |
|---|---|
| 1 | A, B, C, D, E, F, |
| 2 | A. E, Q, T |
| 3 | A, B, G, |
| 5 | A, B, W, T, S, Z |

TABLE 3

| Atomic Rule | Attribute frequency of atomic rule attributes |
|---|---|
| A | 4 |
| B | 3 |
| E | 2 |
| T | 2 |
| D | 1 |
| F | 1 |
| G | 1 |
| S | 1 |
| W | 1 |
| Z | 1 |

If the occurrence of threshold false equals 2 then the false positive rule element list is {A, B}. {A, B} are the atomic rule attributes which occur more frequently than 2 times in the collection of rules which product the most false positive alerts. If for example, rule 1={A or B and (C or D) and E and F} then the atomic rule attribute elements are A, B, C, D, E, F. Then for each rule, for example rules 1, 2, 3, and 5 a NOT A condition is added and assessments of the effects are determined. If the NOT A condition decreases the false positives and/or increases the true positives, more then the threshold, then the rule is modified to include the NOT A condition. For example, the modified rule could be rule 1=(NOT A) and {A or B and (C or D) and E and F}. "A" becomes the additional discriminator added to the rules, as shown in FIGS. 2A and 3. The same applies with testing the other atomic rule attributes.

Figure 4:
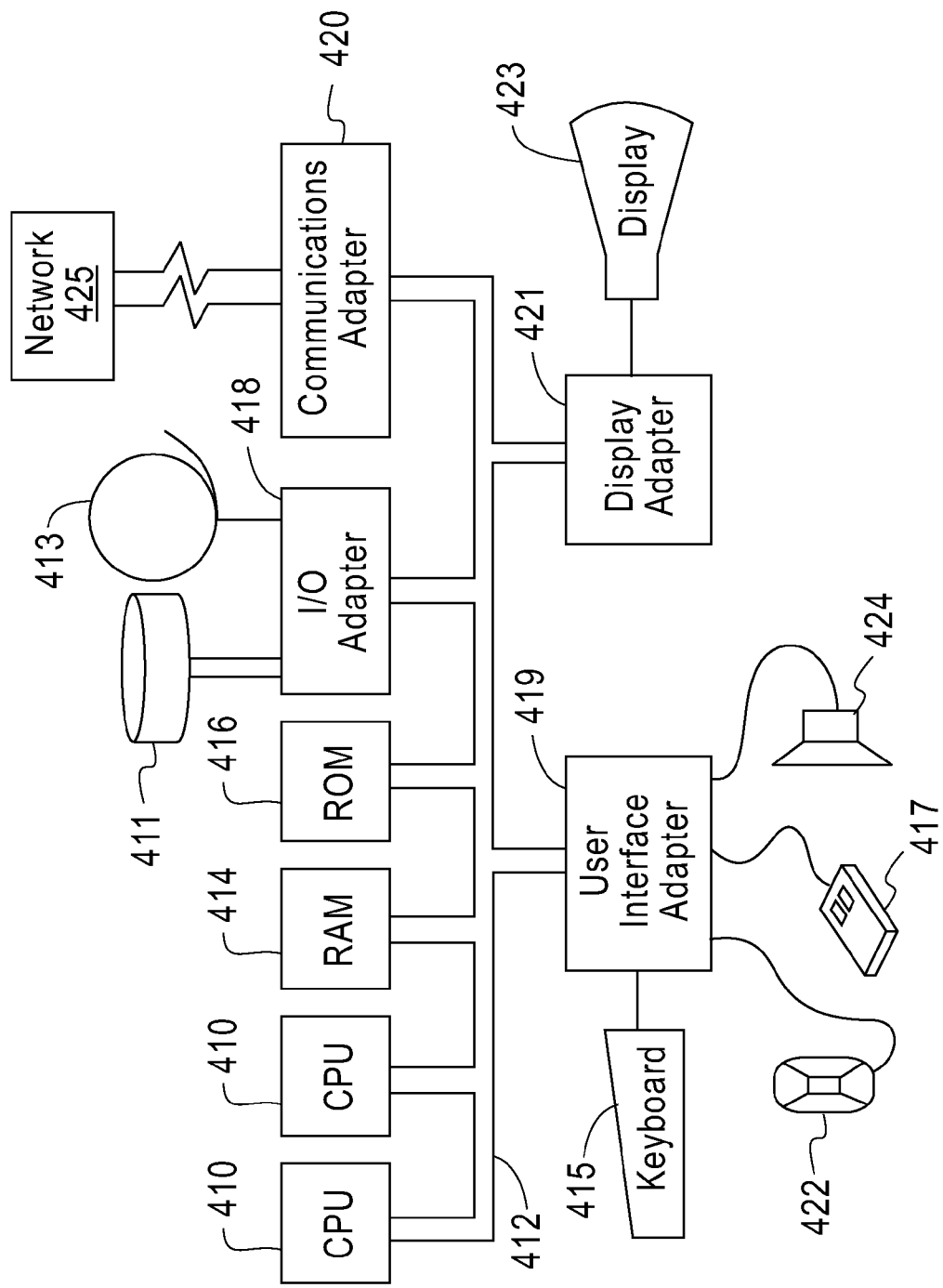
FIG. 4 illustrates a hardware configuration according to an embodiment of the present invention.

Referring now to FIG. 4, this schematic drawing illustrates a hardware configuration of an information handling/computer imaging system in accordance with the embodiments of the invention. The system comprises at least one processor or central processing unit (CPU) 410. The CPUs 410 are interconnected via system bus 412 to various devices such as a random access memory (RAM) 414, read-only memory (ROM) 416, and an input/output (I/O)

adapter 418. The I/O adapter 418 can connect to peripheral devices, such as disk units 411 and tape drives 413, or other program storage devices that are readable by the system. The system can read the inventive instructions on the program storage devices and follow these instructions to execute the methodology of the embodiments of the invention. The system further includes a user interface adapter 419 that connects a keyboard 415, mouse 417, speaker 424, microphone 422, and/or other user interface devices such as a touch screen device (not shown) to the bus 412 to gather user input. Additionally, a communication adapter 420 connects the bus 412 to a data processing network 425, and a display adapter 421 connects the bus 412 to a display device 423 which may be embodied as an output device such as a monitor, printer, or transmitter, for example.

For those skilled in the art, it is apparent that this described method may be applied itteriatvely, such that after descriminator(s) are added to rules, then the process is repeated to indentify if another descriminator is to be added to a rule. This itteraion may continue until no additional rules changes are identified.

For those skilled in the art, it is apparent that this described method may utilize a combination of atomic rule elements as a single element. From the prior illustration, rule 1={A or B and (C or D) and E and F}. This method could consider "(C or D)" as an atomic rule element. Although describes as an atomic element, this method does not restrict the definition of atomic and thus the method can be applied to collections of rule elements which are viewed as a single atomic element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   a computer device receiving data traffic flow and initializing a subroutine to assess alerts for the received data traffic flow;
   the computer device determining a collection of rules which produce more than a threshold of false positive alerts and more than a threshold of true positive alerts for the assessed alerts;
   the computer device determining a logical condition and a rule element to add to the collection of rules; and
   the computer device implementing the added logical condition and rule element if the number of assessed alerts are decreased below a value.

2. The method according to claim 1, wherein the logical condition is a NOT logic condition.

3. The method according to claim 1, wherein the logical condition is a AND logic condition.

4. The method according to claim 1, further comprising the computer device establishing a ratio of true positive to false positive alerts for the collection of rules.

5. The method according to claim 1, further comprising the computer device identifying discriminators within the collection of rules that exceed an occurrence threshold.

6. The method according to claim 5, wherein the identified discriminators are rule elements.

7. The method according to claim 1, wherein the implemented logical condition and element changes a rule.

8. A system comprising:
   one or more processors, one or more computer-readable memories and one or more computer-readable, tangible storage devices;
   a receiving module operatively coupled to at least one of the one or more storage devices for execution by at least one of the one or more processors via at least one of the one or more memories, configured to receive data traffic flow and initializing a subroutine to assess alerts for the received data traffic flow;
   a determining module operatively coupled to at least one of the one or more storage devices for execution by at least one of the one or more processors via at least one of the one or more memories, configured to determine a collection of rules which produce more than a threshold of false positive alerts and more than a threshold of true positive alerts for the assessed alerts; the determining module operatively coupled to at least one of the one or more storage devices for execution by at least one of the one or more processors via at least one of the one or more memories, configured to determine a logical condition and an rule element to add to the collection of rules; and
   an implementing module operatively coupled to at least one of the one or more storage devices for execution by at least one of the one or more processors via at least one of the one or more memories, configured to implement the added logical condition and rule element if the number of assessed alerts are decreased below a value.

9. The system according to claim 8, wherein the logical condition is a NOT logic condition.

10. The system according to claim 8, wherein the logical condition is a AND logic condition.

11. The system according to claim 8, further comprising the determining module operatively coupled to at least one of the one or more storage devices for execution by at least one of the one or more processors via at least one of the one or more memories, configured to establish a ratio of true positive to false positive alerts for the collection of rules.

12. The system according to claim 8, the determining module operatively coupled to at least one of the one or more storage devices for execution by at least one of the one or more processors via at least one of the one or more memories, configured to identify discriminators within the collection of rules that exceed an occurrence threshold.

13. The system according to claim 12, wherein the identified discriminators are rule elements.

14. The system according to claim 8, wherein the implemented logical condition and rule element changes a rule.

15. A computer program product comprising:
   one or more computer-readable, tangible storage medium;
   program instructions, stored on at least one of the one or more storage medium, to receive data traffic flow and initialize a subroutine to assess alerts for the received data traffic flow;
   program instructions, stored on at least one of the one or more storage medium, to determine a collection of rules which produce more than a threshold of false positive alerts and more than a threshold of true positive alerts for the assessed alerts;
   program instructions, stored on at least one of the one or more storage medium, to determine a logical condition and an rule element to add to the collection of rules; and
   program instructions, stored on at least one of the one or more storage medium, to implement the added logical condition and rule element if the number of assessed alerts are decreased below a value.

16. The computer program product according to claim 15, wherein the logical condition is a NOT logic condition.

17. The computer program product according to claim 15, wherein the logical condition is a AND logic condition.

18. The computer program product according to claim 15, further comprising program instructions, stored on at least one of the one or more storage medium, to establish a ratio of true positive to false positive alerts for the collection of rules.

19. The computer program product according to claim 15, further comprising program instructions, stored on at least one of the one or more storage medium, to identify discriminators within the collection of rules that exceed an occurrence threshold.

20. The computer program product according to claim 15, wherein the implemented logical condition and element changes a rule.

\* \* \* \* \*